3,288,865
PROCESS FOR REMOVAL OF TAR FROM BENZOIC ACID OXIDATION REACTOR MASS
Donald F. Pontz, Midland, Mich., assignor to The Dow Chemical Company, Midland, Mich., a corporation of Delaware
No Drawing. Filed Nov. 7, 1963, Ser. No. 322,036
2 Claims. (Cl. 260—621)

The present invention relates to an improved method for recovery of unreacted benzoic acid and catalyst values from the tarry masses which build up and must be removed from the reactor in an air oxidation process for converting benzoic acid to phenol, for example in the manner of U.S. Patent No. 2,727,926 or 2,954,407. The tarry masses just mentioned are residues remaining after the removal of phenol product.

Several methods have been proposed for accomplishing the recovery of the values just mentioned from such tarry masses, but each so far has had numerous drawbacks when placed in commercial operation. This is to say that, while the values are recovered in the stated yields, problems have cropped up which reduce the advantages of the separations. For example, there is at least a partial esterification of the benzoic acid present during practice of processes for extraction of the values from the tarry mass with alcohol-containing solvents. Further, when using aqueous solvents for the extraction of such values from the tarry masses the requirements for the handling of large volumes of water, relative to the volume of the tar fraction, and for operating at super-atmospheric pressures in pressure resistant equipment are troublesome. With regard to the first of the two types of known processes just mentioned, the partial conversion of bendoic acid in the tarry mass to an alkyl benzoate, necessitates an increase in the number of steps required for recovery and separation of the benzoic acid and catalyst values from the tarry mass and, upon recycling such recovered values to the oxidation step of the phenol-producing process, may result in contamination of the phenol product.

The present process for the extraction of said values from such tarry masses utilizes a two-component solvent system which admits of no esterification of the benzoic acid to alkyl benzoate as in an alcohol solvent system. The present process avoids the handling and removal of large quantities of water and the need for pressure-resistant equipment such as are employed in known processes for recovering such values from the tar by extraction with aqueous solvents.

The present invention contemplates treating an aliquot or portion of the reactor mass obtained, for example, by the process of U.S. Patent No. 2,727,926 (viz., the cupric salt catalyzed steam-air oxidation of benzoic acid with metal oxide, hydroxide, or salt promoters such as magnesium) with a solvent consisting of from 70–90% by volume acetone in water. The treatment conveniently is carried out at from about the atmospheric reflux temperature at atmospheris pressure of acetone to about 240° C., and preferably the treatment is initiated at the temperature of the reactor mass as taken from the reactor, i.e., at about 140° to about 180° C. Conveniently the process is carried out by treating the hot reactor mass, which is at from about 140° to about 180° C., with from 70 to 90% by volume acetone-in-water in a container fitted with stirrer and a reflux condenser. The slurry resulting from the acetone treatment cools to about the reflux temperature of the acetone, although if pressure or closed equipment is available higher temperatures may be employed. The cooled slurry is filtered and the filter cake, which will be principally the undesired tar and contain about 10 weight percent or less of the copper and magnesium in the original aliquot, is washed with acetone-water solvent. The acetone-water filtrate and wash are combined and evaporated to dryness to obtain a crystalline mass which can be powdered and returned to the reactor. The crystalline mass will contain 90% by weight or more of the copper and magnesium, as their benzoates, and essentially all of the benzoic acid which initially were present in the original aliquot.

It is convenient to treat the reactor mass with from about 1 to 3 times its weight of the solvent; however, more solvent can be employed but this requires correspondingly larger equipment.

The following example illustrates the present invention, but is not to be construed as limiting.

*Example*

100 grams of benzoic acid oxidation reactor mass, obtained from a reactor operated in the manner of U.S. Patent No. 2,727,926 to produce phenol from benzoic acid, and having a tar content of 12.0% by weight, a copper benzoate content of 2.8%, a Mg benzoate content of 9.6% and 75.6% benzoic acid was heated at atmospheric pressure or thereabout to about 150° C. in a vessel equipped with stirrer, dropping funnel and reflux condenser. The heat source was removed, and 300 grams of a mixture of 9 volumes of acetone and 1 volume of water was added with agitation from the dropping funnel over a 2 to 3 minute period. On completion of the solvent addition the resulting slurry had cooled to the reflux temperature of the acetone. It was poured into a Buchner funnel and filtration accomplished by suction. The tar cake was washed with three 100 ml. portions of the 90% by volume acetone-water mixture and then dried to constant weight in an oven. It was found to weigh 12.54 grams, and to contain about 10.7% of the copper and 8.7% of the magnesium in the withdrawn reactor mass.

The combined filtrates and washes from the above procedure were placed in a distilling flask where the acetone was removed by distillation at atmospheric pressure. This distillate was saved for reuse in the next extraction, with makeup water added. Finally, water was removed from the residue by application of partial vacuum (25 mm. absolute pressure) and increasing the pot temperature to 130° C. The molten residue containing the values was weighed and poured out into a flat pan to crystallize. It was found to weigh 83.7 grams. It could be readily ground to a free-flowing powder. Benzoic acid (2.66 grams) was subsequently found in the distillation column and condenser to bring the total material balance to 98.9%.

Copper and magnesium analyses of original or withdrawn reactor mass and of the tar and values fractions thereof showed that 89.3% of the former metal and 91.3% of the latter metal were recovered in the values fraction which is returned to the reactor.

I claim:
1. In the oxidation of benzoic acid to phenol in the presence of copper and magnesium catalysts, the improved method for the removal of tars from the reactor mass and recovery of the catalysts and other values which consists essentially of treating a portion of the reactor mass with an aqueous acetone solution having an acetone content of about 70% to 90% by volume, at a temperature of from about the atmospheric reflux temperature of acetone to about 240° C. with agitation to produce a homogeneous mass, separating the values laden acetone solvent from the insolubles and recovering the acetone, copper, magnesium, and benzoic acid values from the extract acetone solution.

2. A method for recovering benzoic acid, Cu and Mg from the tars from an oxidation reactor mass wherein benzoic acid is oxidized to phenol, which method comprises heating an aliquot of the reactor mass to a temperature between the fluid point and about 240° C., adding to one part by weight of the heated mass from about 1 to about 3 parts by weight of a 70% to 90% by volume aqueous acetone solution with agitation, filtering the resulting slurry, washing the filter cake with a 70 to 90% by volume acetone-in-water wash, discarding the filter cake, evaporating the filtrate to remove the acetone, thereby recovering essentially all of the benzoic acid and about 90% of the catalytic metals Cu and Mg as copper and magnesium benzoate, returning these values to said reactor and recycling the recovered acetone to the tar extraction step.

References Cited by the Examiner

UNITED STATES PATENTS

| | | | |
|---|---|---|---|
| 2,727,926 | 12/1955 | Kaeding et al. | 260—621 |
| 3,130,235 | 4/1964 | MacBeth | 260—621 |

JOSEPH R. LIBERMAN, *Primary Examiner.*

D. M. HELFER, *Assistant Examiner.*